United States Patent
Partelow et al.

(10) Patent No.: US 7,849,316 B2
(45) Date of Patent: Dec. 7, 2010

(54) METHODS AND APPARATUS FOR SECURE DOCUMENT PRINTING

(75) Inventors: Michael Partelow, San Mateo, CA (US); Mehran Farimani, San Francisco, CA (US); Truxton Fulton, Aptos, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 482 days.

(21) Appl. No.: 11/938,542

(22) Filed: Nov. 12, 2007

(65) Prior Publication Data

US 2010/0023770 A1 Jan. 28, 2010

Related U.S. Application Data

(63) Continuation of application No. 10/192,301, filed on Jul. 10, 2002, now Pat. No. 7,296,157.

(51) Int. Cl.
*H04L 9/00* (2006.01)
*H04K 1/00* (2006.01)
*H04L 15/34* (2006.01)

(52) U.S. Cl. .......................... 713/171; 380/51; 380/55

(58) Field of Classification Search ........................ None
See application file for complete search history.

(56) References Cited

U.S. PATENT DOCUMENTS

| | | | |
|---|---|---|---|
| 4,200,770 A | 4/1980 | Hellman et al. |
| 4,405,829 A | 9/1983 | Rivest et al. |
| 5,583,779 A | 12/1996 | Naclerio et al. |
| 6,061,448 A | 5/2000 | Smith et al. |
| 6,144,950 A | 11/2000 | Davies et al. |
| 6,167,514 A | 12/2000 | Matsui et al. |
| 6,385,728 B1 | 5/2002 | DeBry |
| 6,688,230 B2 | 2/2004 | Goh et al. |
| 6,711,677 B1 | 3/2004 | Wiegley |
| 6,789,191 B1 | 9/2004 | Lapstun et al. |
| 6,789,194 B1 | 9/2004 | Lapstun et al. |
| 6,901,863 B2 | 6/2005 | Gassho et al. |
| 6,918,042 B1 | 7/2005 | Debry |
| 6,952,780 B2 | 10/2005 | Olsen |

(Continued)

FOREIGN PATENT DOCUMENTS

EP 03763075.3 10/2007

(Continued)

OTHER PUBLICATIONS

Press Release, "Jaws Systems Ltd. Announces Jaws Digital Courier—A New PDF-Based Solution for Online Document Delivery," Aug. 31, 2000, San Francisco, CA.

(Continued)

*Primary Examiner*—Christopher A Revak
(74) *Attorney, Agent, or Firm*—Michael A. Glenn; Glenn Patent Group

(57) ABSTRACT

Methods and apparatus are provided for securely printing a print job on a networked printer. An application program running on a networked computer instructs the printer to generate and exchange cryptographic keys. The application program then encrypts the print job using the keys, and then communicates the encrypted print job to the printer. The printer decrypts the received print job and prints the document.

22 Claims, 4 Drawing Sheets

U.S. PATENT DOCUMENTS

| | | |
|---|---|---|
| 7,003,667 B1 | 2/2006 | Slick et al. |
| 7,062,651 B1 | 6/2006 | Lapstun et al. |
| 7,296,157 B2 * | 11/2007 | Partelow et al. ............. 713/171 |
| 7,506,159 B2 * | 3/2009 | Shima et al. ................ 713/161 |
| 2001/0037462 A1 | 11/2001 | Bengston |
| 2002/0131593 A1 | 9/2002 | Parry |
| 2003/0044009 A1 | 3/2003 | Dathathraya |
| 2003/0081788 A1 | 5/2003 | Simpson et al. |
| 2005/0062998 A1 | 3/2005 | Kumashio |
| 2005/0152543 A1 | 7/2005 | Shima et al. |
| 2006/0064580 A1 * | 3/2006 | Euchner et al. ............. 713/156 |

FOREIGN PATENT DOCUMENTS

| | | |
|---|---|---|
| WO | WO 0241133 | 5/2002 |
| WO | PCT/US2003/20690 | 2/2004 |
| WO | PCT/US2003/20690 | 3/2005 |

OTHER PUBLICATIONS

Hewlett-Packard Co., "secure print, hp printing e-services," copyright 2000.

Hewlett-Packard Co., "secure printing, integrated business solutions," copyright 2001.

* cited by examiner

METHODS AND APPARATUS FOR SECURE DOCUMENT PRINTING

REFERENCE TO RELATED APPLICATION

This application is a continuation of U.S. patent application Ser. No. 10/192,301, filed 10 Jul. 2002, now U.S. Pat. No. 7,296,157, which is incorporated by reference herein in its entirety.

BACKGROUND

The present invention relates to document printing. More particularly, this invention relates to secure networked document printing.

A computer network typically includes one or more personal computers (sometimes called "client computers") coupled together via a communications network. The communications network may link client computers located within a single office, or may couple client computers located over a large geographic area. A computer network also may include one or more print output devices, such as printers, copiers, facsimile machines, and plotters (collectively referred to herein as "printers"), that may be used on a shared basis by network users to print documents created or displayed on the client computers. In particular, when a user issues a "print" command from within an application program on a client computer, a print job is created that typically is routed over the network to a selected printer.

If the print job includes confidential or other sensitive information, the security of that information may be compromised in a conventional networked printing environment. For example, a networked computer that includes network snooping software may be able to intercept the print job as it is routed to the selected printer. Previously known techniques for addressing this problem have required special purpose printers that may not be available on existing computer networks, and may be costly to obtain.

For example, Slick et al. European Patent Application No. EP 1 091 285 A2 ("Slick") describes a secure printing method in which print data are first encrypted with a randomly generated symmetric key, and then the symmetric key is encrypted twice, using public keys of both the intended recipient and the intended printer. To implement this technique, the selected printer includes an embedded "smart chip" that contains the printer's private key, and also includes an interface device for reading the intended recipient's private key from a smart card. Slick does not, however, describe secure document printing techniques that may be implemented using conventional printers that do not include such specialized smart chips and smart card interfaces.

Davis et al. U.S. Pat. No. 5,633,932 ("Davis") describes a system and method for preventing a document from printing until the printer locally authenticates the intended recipient. In particular, a sending node first obtains a public key of a selected printing node, encrypts a document using the printer's public key, and then transfers the encrypted document over a network to the printing node. The printing node decrypts the document using the printing node's private key, and then prints the decrypted document only after the intended recipient is authenticated via either a keyboard, keypad, smart card, or biometric input coupled to the printing node. Davis does not describe secure document printing techniques that may be implemented using conventional printers that do not include such specialized authentication interfaces.

Also, Davis does not describe systems that include printers that do not include public and private keys provided by the printer manufacturer Accordingly, such previously known techniques may not be useful for existing computer networks that include conventional printers, without costly replacement or retrofit of the printers to include specialized hardware. It therefore would be desirable to provide methods and apparatus for securely printing a document over a communications network using conventional printers.

SUMMARY

In view of the foregoing, it is an object of this invention to provide methods and apparatus for securely printing a document over a communications network using conventional printers. These and other objects of the present invention are accomplished by providing a secure client application that downloads software instructions to a programmable networked printer. The software instructions program the printer to generate and exchange cryptographic keys with the secure client application, and then to decrypt an encrypted print job.

BRIEF DESCRIPTION OF THE DRAWINGS

The above mentioned objects and features of this invention can be more clearly understood from the following detailed description considered in conjunction with the following drawings, in which the same reference numerals denote the same structural elements throughout, and in which.

DETAILED DESCRIPTION

Figure 1:
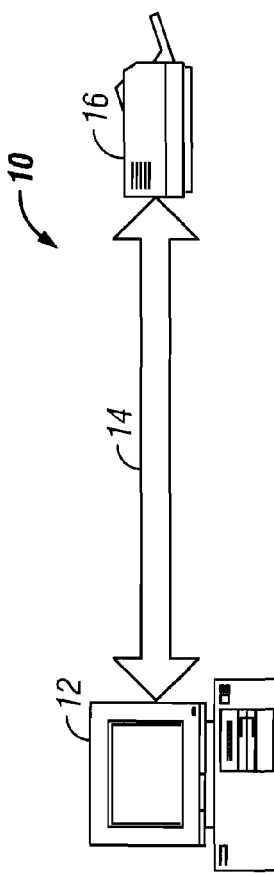
FIG. 1 is a schematic diagram of a previously known system for printing a document on a networked printer.

In accordance with the present invention, methods and apparatus are described for securely printing a document over a computer network. Referring to FIG. 1, a conventional computer network is described. Computer network 10 includes client computer 12, communications path 14 and printer 16. Client computer 12 may be any conventional computer, such as a personal computer, desktop computer, laptop computer, handheld computer, computer workstation, personal digital assistant, or any other similar computer. Communications path 14 may be any conventional communications network such as a local area network, wide area network, public switched telephone network, wireless network, Internet, or other similar communications network. Printer 16 may be any conventional print output device, such as a laser printer, inkjet printer, facsimile device, plotter, or other similar print output device.

Client computer 12 typically includes application software that may be used to create, display and print a document, such as a word processing document, spreadsheet, presentation, digital image, or other similar document. Typically, the software application or a print driver formats the document into a print file using a page description language ("PDL"), such as PCL or PostScript. The PDL print file can then be communicated over communications path 14 to printer 16, which receives, interprets and prints the document.

Figure 2:
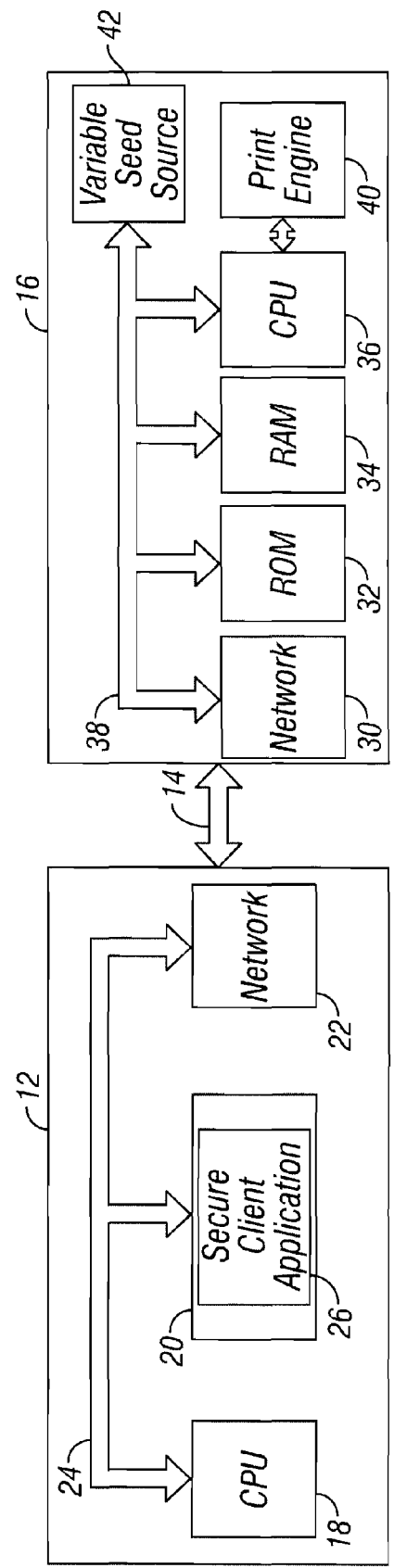
FIG. 2 is a block diagram of an exemplary system for securely printing a document in accordance with this invention.

Referring now to FIG. 2, an exemplary system in accordance with this invention is described for securely printing a document on a computer network, such as the network of FIG. 1. As shown in FIG. 2, client computer 12 includes central processing unit ("CPU") 18, memory 20, and network interface 22, all coupled to system bus 24. CPU 18 may be any conventional programmable microprocessor or similar processor. Memory 20 may be any conventional computer-readable memory media, such a magnetic memory, optical disk memory, or other similar type of memory media. Memory 20 includes secure client application ("SCA") 26, described in more detail below, that securely communicates documents to a networked printer in accordance with this invention. Network interface 22 is a conventional network interface that is used to interface client computer 12 to communications path 14.

Printer 16 is a conventional printer that includes network interface 30, read-only memory ("ROM") 32, random access memory ("RAM") 34, and CPU 36, coupled via system bus 38, and print engine 40. Network interface 30 is a conventional network interface that is used to interface printer 16 to communications path 14. ROM 32 includes program instructions that form the control program for printer 16. CPU 36 may be any conventional programmable microprocessor, or similar processor. CPU 36 processes program instructions in ROM 32, and controls print engine 40, which is a standard part of a conventional printer. Printer 16 also includes variable seed source 42, coupled to system bus 38. Variable seed source 42 may be software or hardware that samples a clock signal within printer 16 to provide a seed $S_R$ for a pseudo random number generator.

Printer 16 is a programmable printer. That is, the printer has facilities for downloading programs to it and executing these programs. PostScript is one previously known programming language used in a wide variety of conventional printers. In particular, PostScript is an interpreted language that includes a PDL that may be used to describe how to draw objects on a drawing surface. PostScript also is a powerful programming language that may be used to program the operation of CPU 36 to perform a wide variety of functions.

In accordance with this invention, SCA 26 downloads computer program instructions to printer 16 to implement a cryptographic key exchange program and an encryption/decryption program. As used herein, a "key" is an encoding or decoding parameter for a cryptographic algorithm. The key exchange program instructs the printer to generate and exchange an encryption key with SCA 26, which encrypts print data using the encryption key, and transmits the encrypted print data to printer 16. The encryption/decryption program instructs printer 16 to decrypt the encrypted print data using a decryption key. Accordingly, the print data are securely communicated between client computer 12 and conventional printer 16.

Figure 3:
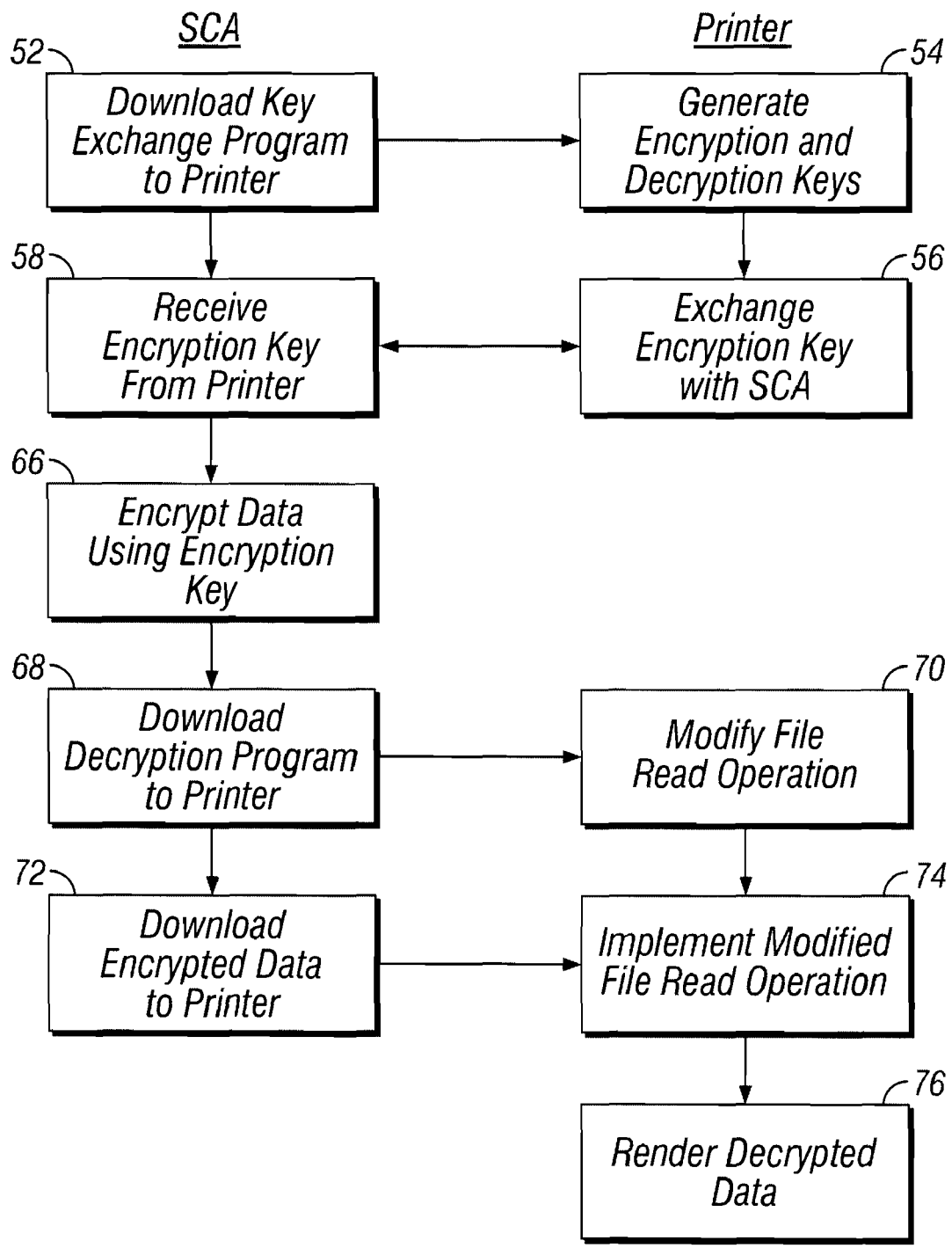
FIG. 3 is a flowchart of an exemplary method for securely printing a document in accordance with this invention.

Referring now to FIG. 3, an exemplary key exchange and encryption/decryption method in accordance with this invention is described. In particular, FIG. 3 describes an exemplary method that may be implemented by SCA 26 and printer 16. Beginning at step 52, SCA 26 downloads a key exchange program to RAM 34 in printer 16. The key exchange program may be, for example, a set of computer program instructions or sequence of PostScript procedures that instruct printer 16 to generate and exchange one or more cryptographic keys with SCA 26 in accordance with a key establishment protocol, such as the Rivest Shamir Adlemann ("RSA") protocol, the Diffie-Hellman key agreement protocol, or any other key establishment protocol.

At step 54, the key exchange program instructs printer 16 to generate an encryption key $E_P$ and a decryption key $D_P$. As part of this step, the key exchange program first instructs printer 16 to generate a pseudo-random number using seed $S_R$ from variable seed source 42. For example, if printer 16 is capable of implementing PostScript commands, the key exchange program may use the PostScript "usertime" or "realtime" operators to generate seed $S_R$, and may use the PostScript "rand" operator and seed $S_R$ to generate the pseudo random number. Printer 16 uses the pseudo random number to generate encryption key $E_P$ and decryption key $D_P$. Alternatively, other sources of entropy in the printer can be exploited to generate the seed $S_R$, or a custom made program can be used to generate the pseudo random number instead of the "rand" operator.

Next, at step 56, the key exchange program executes on printer 16 to exchange encryption key $E_P$ with SCA 26, which receives $E_P$ at step 58. At step 66, SCA 26 encrypts print data using encryption key $E_P$. In particular, SCA 28 may encrypt the print data using encryption key $E_P$ and a cipher, such as RC4, RC5, twofish, blowfish, IDEA, DES, 3DES, Rijndael, or may encrypt the print data using encryption key $E_P$ and an asymmetric public key algorithm. Next, at step 68, SCA 26 downloads a decryption program to RAM 34 in printer 16. The decryption program may be a set of computer program instructions such as a sequence of PostScript procedures that instruct printer 16 to decrypt a received print job using the printer's decryption key $D_P$ and the cryptographic algorithm used by SCA 26 to encrypt the print data. For example, a conventional printer that implements PostScript commands typically reads PostScript data such as print data from an incoming data stream, or from an internal disk drive. In accordance with this invention, decryption programs modify the conventional read operation with a customized operation to decrypt the print data.

In particular, at step 70, the decryption program running on printer 16 modifies the conventional file read operation to enable printer 16 to decrypt print data using decryption key $D_P$. For example, the decryption program may insert PostScript decryption filters or an embedded decryption interpreter in the incoming data stream to decrypt incoming encrypted data using decryption key $D_P$. Alternatively, the decryption program may override the conventional file read operator with a customized operator to decrypt incoming or stored print data using decryption key $D_P$. Persons of ordinary skill in the art will understand that other similar techniques may be used to modify the conventional file read operation with an operation or sequence of operations that cause printer 16 to decrypt incoming data using decryption key $D_P$.

At step 72, SCA 26 downloads the encrypted data to printer 16. SCA 26 may download data in a single data block, or in a sequence of multiple smaller data blocks. At step 74, the decryption program instructs printer 16 to implement the modified file read operation to decrypt incoming data. Upon implementing the modified operation, printer 16 decrypts the print data and the renders the print data at step 76. Note that several steps in the above-described method may be interchanged. For example, SCA 26 may download the decryption program to RAM 34 prior to receiving the encryption key from printer 16, or prior to encrypting print data using encryption key $E_P$. All such variations are within the scope of this invention.

Figure 4:
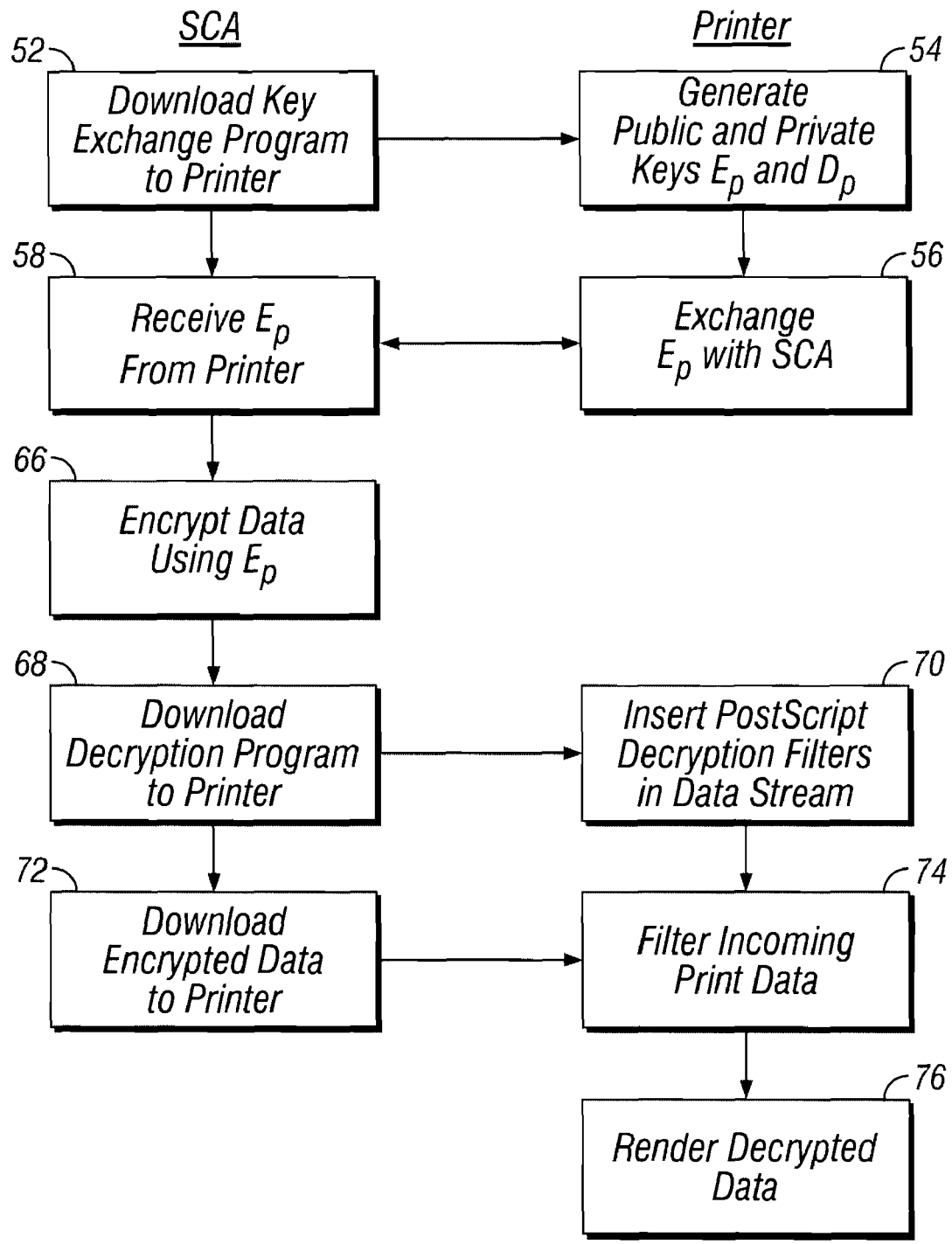
FIG. 4 is a block diagram of a more specific exemplary method for securely printing a document in accordance with this invention.

Referring now to FIG. 4, a more specific exemplary key exchange and encryption/decryption method in accordance with this invention is described. As described above, the key exchange program may be implemented using any suitable programming language, such as PostScript, that may be used to program a programmable printer. Beginning at step 52, SCA 26 downloads a key exchange program to RAM 34 in printer 16. In the embodiment of FIG. 4, the key exchange program is a sequence of PostScript procedures that instruct printer 16 to generate and exchange cryptographic keys in accordance with the Rivest Shamir Adlemann ("RSA") key exchange algorithm. In particular, at step 54, the key exchange program instructs printer 16 to generate a pseudo random number (as described above) and then generate public key $E_P$ and private key $D_P$.

Next, at step 56, the key exchange program executes on printer 16 to exchange public key $E_P$ with SCA 26. In particular, printer 16 transmits a copy of its public key $E_P$ to SCA 26, which receives $E_P$ at step 58. At step 66, SCA 26 encrypts print data using the printer's public key $E_P$. In particular, SCA 28 encrypts the print data using public key $E_P$ and an asymmetric public key algorithm. Next, at step 68, SCA 26 downloads a sequence of PostScript procedures that instruct printer 16 to decrypt a received print job using the printer's private key $D_P$. In particular, at step 70, the decryption program running on printer 16 inserts PostScript decryption filters in the incoming data stream to decrypt incoming encrypted data using the printer's private key $D_P$.

At step 72, SCA 26 downloads the encrypted data to printer 16. SCA 26 may download data in a single data block, or in a sequence of multiple smaller data blocks. At step 74, the decryption program instructs printer 16 to implement the modified file read operation to decrypt incoming data. In particular, printer 16 filters the incoming print data using the PostScript decryption filters. Upon implementing the modified operation, printer 16 decrypts the print data and the renders the print data at step 76. Note that several steps in the above-described method may be interchanged. For example, SCA 26 may download the decryption program to RAM 34 prior to receiving the public key $E_P$ from printer 16, or prior to encrypting print data using the printer's public key $E_P$. All such variations are within the scope of this invention.

Figure 5:
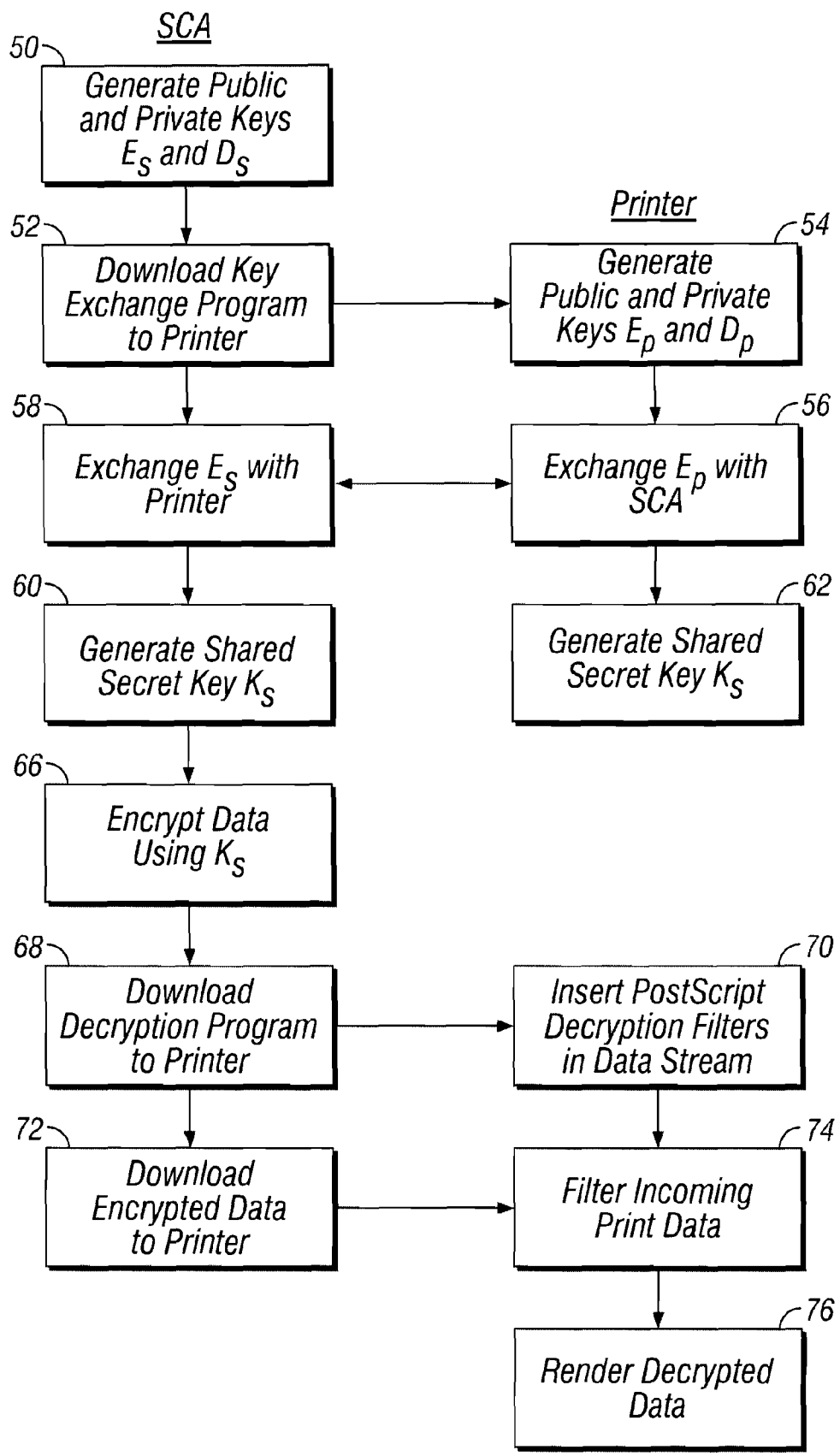
FIG. 5 is a block diagram of another more specific exemplary method for securely printing a document in accordance with this invention.

Referring now to FIG. 5, another more specific exemplary key exchange and encryption/decryption method in accordance with this invention is described. As described above, the key exchange program may be implemented using any suitable programming language, such as PostScript, that may be used to program a programmable printer. In the embodiment of FIG. 5, the key exchange program is a sequence of PostScript procedures that instruct printer 16 to generate and exchange cryptographic keys in accordance with the Diffie-Hellman key exchange algorithm. Beginning at step 50, SCA 26 generates public key $E_S$ and private key $D_S$. At step 52, SCA 26 downloads a key exchange program to RAM 34 in printer 16. At step 54, the key exchange program instructs printer 16 to generate a pseudo random number (as described above) and then generate public key $E_P$ and private key $D_P$.

Next, at step 56, the key exchange program executes on printer 16 to exchange public keys $E_P$ and $E_S$ with SCA 26. In particular, printer 16 transmits a copy of its public key $E_P$ to SCA 26, which receives $E_P$ at step 58. In addition, SCA 26 transmits a copy of its public key $E_S$ to printer 16. At steps 60 SCA 26 generates a copy of a shared secret key $K_S$ using the printer's public key $E_P$ and the SCA's private key Ds. At step 62, the key exchange program instructs printer 16 to generate a copy of shared secret key $K_S$ using the SCA's public key $E_S$ and the printer's private key $D_P$. Thus, at the end of steps 60 and 62, SCA 26 and printer 16 each have a copy of shared secret key $K_S$.

Next, at step 66, SCA 26 encrypts print data using shared secret key $K_S$. In particular, SCA 28 encrypts the print data using shared secret key $K_S$ and a cipher, such as RC4, RC5, twofish, blowfish, IDEA, DES, 3DES, Rijndael or any other cryptographic algorithm. Next, at step 68, SCA 26 downloads a sequence of PostScript procedures that instruct printer 16 to decrypt a received print job using shared secret key $K_S$. In particular, at step 70, the decryption program running on printer 16 inserts PostScript decryption filters in the incoming data stream to decrypt incoming encrypted data using shared secret key $K_S$.

At step 72, SCA 26 downloads the encrypted data to printer 16. SCA 26 may download data in a single data block, or in a sequence of multiple smaller data blocks. At step 74, the decryption program instructs printer 16 to implement the modified file read operation to decrypt incoming data. In particular, printer 16 filters the incoming print data using the PostScript decryption filters. Upon implementing the modified operation, printer 16 decrypts the print data and the renders the print data at step 76. Note that several steps in the above-described method may be interchanged. For example, SCA 26 may download the decryption program to RAM 34 prior to exchanging public keys with printer 16, or prior to encrypting print data using shared secret key $K_S$. All such variations are within the scope of this invention.

Persons of ordinary skill in the art will understand that methods in accordance with this invention may be implemented in computer software and/or hardware. In particular, methods in accordance with this invention may be implemented using any program language that may be used to program a programmable printer. Persons of ordinary skill in the art also will recognize that methods and apparatus in accordance with this invention may be implemented using steps or devices other than those shown and discussed above. All such modifications are within the scope of the present invention, which is limited only by the claims that follow.

The invention claimed is:

1. A system comprising:
a client computer adapted to:
(a) send first and second sets of computer program instructions to a printer, the first set of computer program instructions adapted to cause the printer to generate a first encryption key and a first decryption key, the second set of computer program instructions adapted to enable the printer to decrypt print data;
(b) encrypt print data at the client computer using the first encryption key; and
(c) send the encrypted print data to the printer;
wherein the printer is adapted to send the first encryption key to the client computer, and decrypt the encrypted print data using the first decryption key.

2. The system of claim 1, wherein the first set of computer program instructions is adapted to cause the printer to generate a pair of cryptographic keys.

3. The system of claim 2, wherein the pair of cryptographic keys are public and private keys of key encryption algorithm.

4. The system of claim 1, wherein the first set of computer program instructions also is adapted to cause the printer to generate a second encryption key.

5. The system of claim 4, wherein the second encryption key is a shared secret key.

6. The system of claim 1, wherein the first set of computer program instructions also is adapted to cause the printer to provide a copy of the first encryption key to the client computer.

7. The system of claim 1, wherein:
the client computer comprises a third encryption key; and the first set of computer program instructions is adapted to cause the printer to generate a second encryption key.

8. The system of claim 7, wherein the first set of computer instructions also is adapted to cause the printer to provide a copy of the second encryption key to the client computer.

9. The system of claim 1, wherein the first set of computer program instructions comprises a PostScript procedure.

10. The system of claim 1, wherein the second set of computer program instructions also is adapted to cause the printer to modify a file read operation.

11. The system of claim 10, wherein the modified file read operation comprises a software filter that causes the printer to decrypt the print data.

12. The system of claim 1, wherein the second set of computer program instructions comprises a PostScript procedure.

13. A system comprising:
a client computer adapted to:
(a) send first and second sets of computer program instructions to a printer, the first set of computer program instructions causing the printer to generate a first cryptographic key, the second set of computer program instructions causing the printer to decrypt encrypted print data using a second cryptographic key;
(b) use the first cryptographic key to generate the second cryptographic key;
(c) encrypt print data using the second cryptographic key; and
(d) send the encrypted print data to the printer;
wherein the printer is adapted to send the first cryptographic key to the client computer, and use the first cryptographic key to generate the second cryptographic key.

14. The system of claim 13, wherein the first set of computer program instructions causes the printer to generate public and private keys of a key encryption algorithm.

15. The system of claim 14, wherein the second cryptographic key is a shared secret key generated according to the Diffie-Hellman key agreement protocol.

16. The system of claim 13, wherein the print data are encrypted using a cipher.

17. The system of claim 13, wherein the first set of computer program instructions comprises a PostScript procedure.

18. The system of claim 13, wherein the second set of computer program instructions comprises a PostScript procedure.

19. A system comprising:
a client computer adapted to:
(a) generate a public and private cryptographic key pair;
(b) send a key exchange program to a printer, the key exchange program generating a public and private cryptographic key pair at the printer and exchanging the public key of the printer with the public key of the client computer;
(c) generate a secret key using the printer's public key and the client computer's private key;
(d) provide a decryption program to the printer, wherein the decryption program is adapted to modify a file read operation at the printer;
(e) encrypt print data using the secret key; and
(f) send the encrypted print data to the printer;
wherein the printer is adapted to generate a copy of the secret key using the client computer's public key and the printer's private key, and implement the modified file read operation to decrypt the encrypted print data using the secret key.

20. The system of claim 19, further comprising rendering the decrypted print data at the printer.

21. The system of claim 19, wherein the key exchange program comprises a PostScript procedure.

22. The system of claim 19, wherein the decryption program comprises a PostScript procedure.

* * * * *